United States Patent

Richards

[15] 3,678,210

[45] July 18, 1972

[54] MAGNETIC BELT RECORDER HEAD ADJUSTMENT

[72] Inventor: William D. Richards, Medway, Mass.

[73] Assignee: American Optical Corporation, Southbridge, Mass.

[22] Filed: May 17, 1971

[21] Appl. No.: 144,013

[52] U.S. Cl. ....................................179/100.2 CA, 274/4 A

[51] Int. Cl. ....................................G11b 5/56, G11b 21/24

[58] Field of Search .................179/100.2 CA; 274/4 A, 11 A

[56] References Cited

UNITED STATES PATENTS

| | | | |
|---|---|---|---|
| 2,680,785 | 6/1954 | Franklin | 274/4 A |
| 2,943,860 | 7/1960 | D'Arcy | 179/100.2 CA |
| 3,310,791 | 3/1967 | Fischer | 179/100.2 CA |

*Primary Examiner*—Bernard Konick
*Assistant Examiner*—Robert S. Tupper
*Attorney*—William C. Nealon, Robert J. Bird, Bernard L. Sweeney, Jeremiah J. Duggan and Joel Wall

[57] ABSTRACT

A mounting device for a magnetic belt recorder head which is adjustable on the X, Y, and Z axes for proper alignment of the head relative to the belt. This universal adjustibility is provided by opposing locking screws which permit arcuate displacement about X and Z axes and a spindle mount which permits arcuate movement about a Y axis.

1 Claim, 6 Drawing Figures

INVENTOR.
WILLIAM D. RICHARDS
BY
ATTORNEY

MAGNETIC BELT RECORDER HEAD ADJUSTMENT

BACKGROUND OF THE INVENTION

The present invention relates to adjusting devices generally, and more particularly to a device for an adjustment and alignment of a belt recorder head relative to a magnetic belt.

In some recorder applications, such as in medical instrumentation, for example, as used in heartbeat detection and analysis, where a short delay between detection and writeout is desired, a noise free data storage is required. To reduce the signal distortion caused by the recorder speed variations a compensation signal is recorded simultaneously on a second channel. These two channels must coincide in time, therefore a very accurate head alignment device is required.

Such multi-channel instruments are known, and they include provisions for the accurate alignment of the head relative to the belt. However, in general, these provisions have been relatively difficult to adjust and maintain adjustment.

SUMMARY OF THE INVENTION

It is an object of the present invention to provide an adjustment device for the alignment of a magnetic head relative to a magnetic belt which is simple and positive in operation.

Briefly, the present invention is practiced in one form by a magnetic head rotatably mounted on a vertical spindle relative to a yoke. The yoke is bored to slip over a vertical frame-mounted shaft such that the shaft and yoke fit snugly at their base portion and define a clearance at their top portion. Thus, the yoke can be deflected about X and Z axes and the head can be displaced about the Y axis for any desired attitude of head relative to the belt.

DRAWING

Other objects, advantages, and features of this invention will become apparent from the following description of one embodiment thereof, given in connection with the accompanying drawing, in which.

DESCRIPTION

Figure 1:
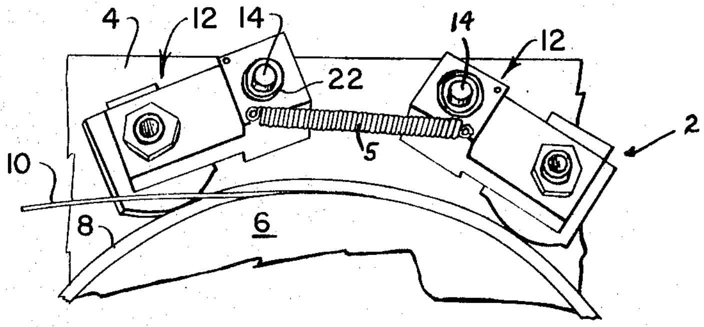
FIG. 1 is a combination view of the major elements of the environment of this invention.

Referring now to FIG. 1, there is generally indicated at 2, part of a magnetic drum recorder including a frame 4 and a rotatable wheel 6 around which is disposed a magnetic belt 8. The wheel 6 is driven by a suitable drive belt 10 and by associated drive means which are not shown in the drawing and are not a part of this invention. A pair of tape head assemblies, generally indicated at 12, are mounted on frame 4 by means of frame-mounted shafts 14 and disposed and biased by spring 5 in operative association with magnetic belt wheel 6. Head assemblies 12 are identical, except for electrical characteristics, and only one need be described.

Figure 2:
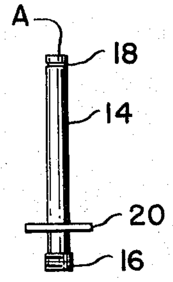
FIG. 2 is a side view of the shaft.

In FIG. 2, shaft 14 is shown and includes a screw thread 16 at one of its ends and a snap groove 18 at its other end. Shaft 14 includes a radially extending collar bearing 20 adjacent to its threads. Shaft 14 is rigidly mounted to frame 4 by means of threads 16.

Figure 3:
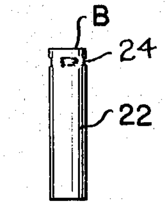
FIG. 3 is a side view of the sleeve member.

FIG. 3 shows a cylindrical sleeve 22 from which are cut four flat surfaces 24 near one end and spaced 90° apart around the sleeve. Sleeve 22 defines a cylindrical bore by which it mounts on shaft 14 atop bearing surface 20.

Figure 4:
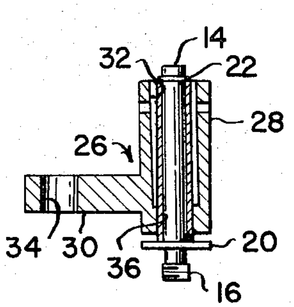
FIG. 4 is a side sectional view of the joke and sleeve member.

FIG. 4 shows in section a yoke member 26 which is of an L-shaped configuration including a body portion 28 (disposed vertically) and a laterally extending arm 30. Body 28 defines a generally cylindrical aperture 32 and 36 extending vertically therethrough. Yoke member 26 is mounted on sleeve 22 and shaft 14 which pass through aperture 32 and 36. As shown in the drawing, aperture 32 and 36 has a smaller diameter at its lower end portion 36 than at its upper portion 32. This is to provide a close sliding fit between sleeve 22 and aperture 36 for a short distance at the lower part of the body 28 while providing clearance between sleeve 22 and aperture 32 at the top.

Figure 5:
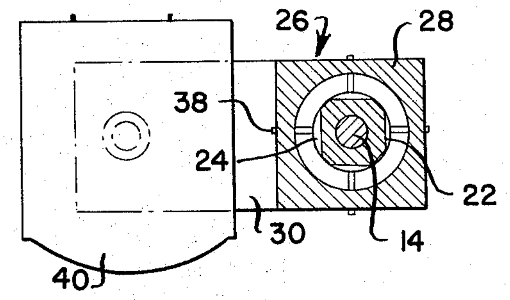
FIG. 5 is a top view, partly in section, along the line V—V of FIG. 6 and showing the assembled shaft, sleeve, yoke and magnetic head.

Referring now to FIG. 5, the assembled shaft 14, sleeve 22 and yoke 26 are shown in plan view, partially in section. The flats 24 on sleeve 22 are in registry with set screws 38 which pass radially inwardly through body portion 28 and aperture 32. These set screws are disposed 90° apart around the body as are the flats 24 on sleeve 22. The arm 30 of yoke 26 rotatably supports a magnetic head member 40 by means of a spindle 42 (see FIG. 6) extending from head 40 and through the aperture 34 of arm 30.

Figure 6:
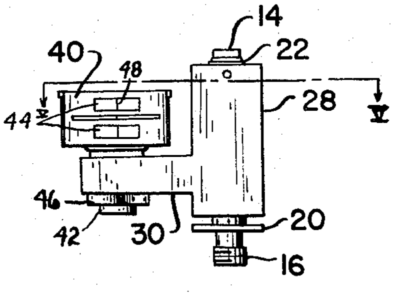
FIG. 6 is a side view of the assembled yoke and magnetic head, looking toward the head pole faces.

Referring now to FIG. 6, the head 40 is shown as viewed facing its pole faces 44. The spindle 42 extends from the body of head 40 and fits rotatably within aperture 34 on arm 30 and locked in adjustment by nut 46. The pole faces 44 are the magnetic contact elements of the magnetic head. The pole gaps form a vertical line 48 across each of the pole faces 44, these reference lines being colinear. When tape head 40 is in perfect alignment relative to a magnetic belt 8, reference lines 48 on both poles 44 contact the belt simultaneously and with equal pressure, and are perpendicular to the edge of the drum. It is to accomplish this alignment of head 40 relative to belt 8 that the head 40 is movable about the X, Y, and Z axes.

Reference will now be made generally to FIGS. 4 and 5. Shaft 14 is threaded and thereby rigidly fastened to the frame 4 and carries sleeve 22 rotatably mounted thereon. The sleeve 22 is rotatable so that the head 40 may be biased with constant pressure against belt 8 by spring 5 as the drum surface varies. Sleeve 22 projecting upwardly into aperture 32 from its close fit with aperture 36 forms a cantilever or bearing element against which set screws 38 bear. The clearance between sleeve 22 and aperture 32 allows the yoke 26 to be adjusted by arcuate displacement about the X or Z axes by selectively loosening and tightening of opposite set screws 38. In addition, magnetic head 40 is adjustable by arcuate displacement about the Y axis by virtue of its spindle mounting in aperture 34. Thus, with arcuate movement about all three axes possible, the attitude of contact gap area 48 on the magnetic head 40 is adjustable to any condition within a certain solid angle, the limits of which are beyond the desired range of adjustability for the application involved. In other words, within the limit of such solid angle, the magnetic head pole face is universally positionable so that the reference gap lines 48 of pole faces 44 can be properly aligned.

It may occur to others to make modifications of this invention which will remain within its concept and scope and not constitute a different invention. Accordingly, it is intended that the invention be not limited by the details of its description and illustration, but only by the following claims.

What is claimed is:

1. A magnetic pick-up instrument including a frame, a data belt and means to drive the same, and one or more magnetic heads mounted on said frame and operatively disposed relative to said data belt, wherein the improvement comprises an adjustable support for said heads on said frame, said adjustable support comprising:

a shaft fixed to and extending from said frame to form a stationary bearing element;

a yoke defining a cylindrical aperture having a first diameter at its base and a second larger diameter through its upper portion so that said yoke is laterally unmovable relative to said bearing element at its base portion and movable relative to said bearing element at its upper portion, said yoke also including means to support said head rotatably in a plane perpendicular to the axis of said aperture, said yoke having a plurality of screws directed radially inwardly therethrough and into said aperture upper portion to bear upon said bearing element, the rotatability of said head and the adjustment of said screws permitting adjustment of the head about three mutually perpendicular axes.

* * * * *